S. M. LOVELL.
TURF AND GRUBBING COULTER.
No. 185,686. Patented Dec. 26, 1876.
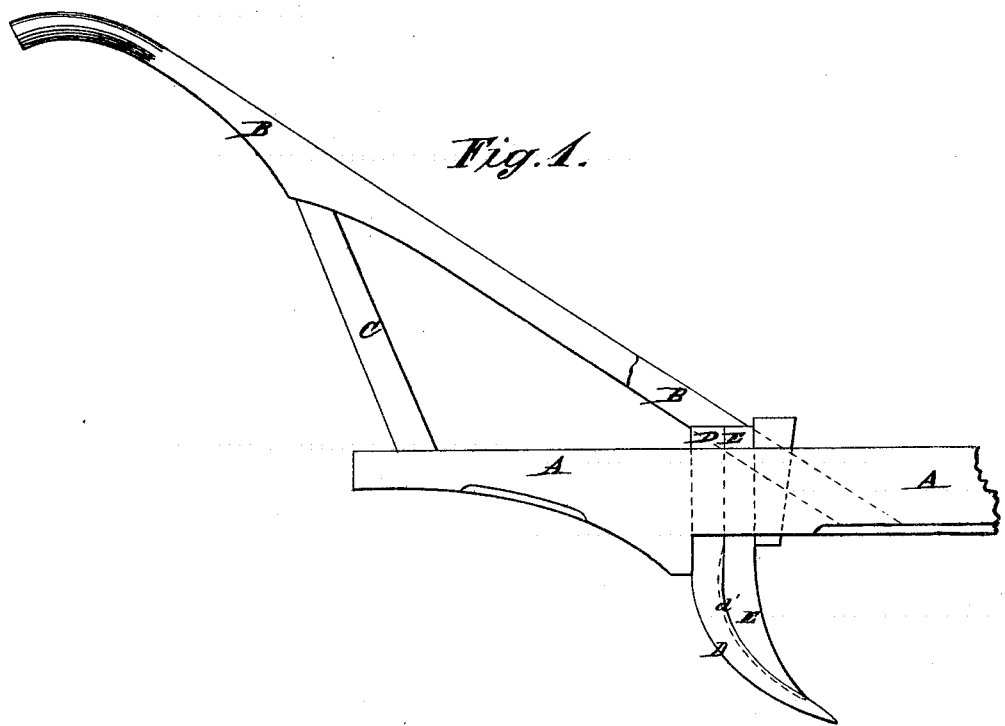
Fig. 1.
 
Fig. 2.  Fig. 3.
WITNESSES:
H. Ryzzmst
John Goethals
INVENTOR:
S. M. Lovell.
BY
Munn & Co.
ATTORNEYS.
THE GRAPHIC CO. N.Y.

UNITED STATES PATENT OFFICE.

SAMUEL M. LOVELL, OF SHADY GROVE, VIRGINIA.

IMPROVEMENT IN TURF AND GRUBBING COLTERS.

Specification forming part of Letters Patent No. 185,686, dated December 26, 1876; application filed September 22, 1876.

*To all whom it may concern:*

Be it known that I, SAMUEL M. LOVELL, of Shady Grove, in the county of Franklin and State of Virginia, have invented a new and Improved Turf and Grubbing Colter, of which the following is a specification:

In the accompanying drawing, Figure 1 is a side view of my improved colter, shown as applied to a plow-stock. Fig. 2 is a detail front view of the colter, and Fig. 3 is a detail front view of the knife.

Similar letters of reference indicate corresponding parts.

The object of this invention is to furnish an improved colter for cutting turf or sod, to enable it to be turned by the plow, and to cut off roots that may be in the ground and that would obstruct the plow, and which shall be simple in construction, easily kept in order, and of light draft.

The invention will first be described in connection with drawing, and then pointed out in the claim.

In the drawing, A represents a plow-beam. B are the handles, and C is the upright that supports the said handles. D is the colter or knife-holder, the lower part of which is curved forward, and has a longitudinal groove, d, in its forward side to receive the rear edge of the knife E, said rear edge being made upon the same curve as the forward side of the colter or holder D.

The shanks of the holder D and knife E are so formed as to fit into a mortise or slot in the beam A, where they are secured in place by a wedge-key driven into the said mortise in front of said shanks.

The knife E is made thin, so that the wear will keep it sharp, and so that it may be easily ground, if required.

I am aware that it is not new to use a cutter in front of a shovel or other plow; but

What I claim is—

A grubber having colter D and knife E, the colter end being curved and extended beyond the knife, while the latter is seated on and in a front groove of the colter, as shown and described.

SAMUEL M. LOVELL.

Witnesses:
 MORDECAI COOK,
 JAMES M. WOODY.